(12) United States Patent
Berger et al.

(10) Patent No.: US 10,145,295 B2
(45) Date of Patent: Dec. 4, 2018

(54) SUPERCHARGE AIR COOLER

(71) Applicant: MAHLE International GmbH, Stuttgart (DE)

(72) Inventors: Thierry Berger, Thionville (FR); Fadil Ayad, Augny (FR); Bruno Prochette, Longwy (FR)

(73) Assignee: MAHLE International GmbH, Stuttgart (DE)

( * ) Notice: Subject to any disclaimer, the term of this patent is extended or adjusted under 35 U.S.C. 154(b) by 169 days.

(21) Appl. No.: 14/414,612

(22) PCT Filed: Jul. 12, 2013

(86) PCT No.: PCT/EP2013/064812
§ 371 (c)(1),
(2) Date: Aug. 13, 2015

(87) PCT Pub. No.: WO2014/009537
PCT Pub. Date: Jan. 16, 2014

(65) Prior Publication Data
US 2016/0003128 A1    Jan. 7, 2016

(30) Foreign Application Priority Data
Jul. 13, 2012   (FR) ...................................... 12 56817

(51) Int. Cl.
*F28D 7/02*    (2006.01)
*F02B 29/04*    (2006.01)
(Continued)

(52) U.S. Cl.
CPC ...... *F02B 29/0462* (2013.01); *F02B 29/0443* (2013.01); *F02B 29/0475* (2013.01);
(Continued)

(58) Field of Classification Search
CPC ........ F28F 3/086; F28F 13/14; F28F 2210/04; F28F 2210/08; F28F 3/044; F28D 9/0093;
(Continued)

(56) References Cited

U.S. PATENT DOCUMENTS 5,172,759 A * 12/1992 Shimoya ............... F25B 39/022
165/110
5,180,004 A * 1/1993 Nguyen ............... B60H 1/3227
165/135
(Continued)

FOREIGN PATENT DOCUMENTS

EP    2187157 A2 * 5/2010 .......... F28D 1/0341
EP    2481899     1/2012

*Primary Examiner* — Jason Thompson
(74) *Attorney, Agent, or Firm* — Brinks Gilson & Lione

(57) ABSTRACT

The invention relates to a plate heat exchanger forming between its plates a first flat flow tube in which a first fluid circulates between a first inlet orifice and a first outlet orifice, and a second flat flow tube in which a second fluid circulates between a second inlet orifice and a second outlet orifice. The two flat tubes form parallel arms which extend in a longitudinal direction (L) perpendicular to a transverse air flow traversing the heat exchanger, the first tube being upstream in the air flow and the second tube being downstream.

15 Claims, 5 Drawing Sheets

(51) Int. Cl.
  *F28F 3/04* (2006.01)
  *F28D 9/00* (2006.01)
  *F02M 35/10* (2006.01)
  *F02M 35/112* (2006.01)
  *F28F 13/08* (2006.01)
  *F28D 21/00* (2006.01)

(52) U.S. Cl.
  CPC .... *F02M 35/10268* (2013.01); *F02M 35/112* (2013.01); *F28D 9/0043* (2013.01); *F28D 9/0056* (2013.01); *F28D 9/0093* (2013.01); *F28F 3/044* (2013.01); *F28F 13/08* (2013.01); *F28D 2021/0082* (2013.01); *Y02T 10/146* (2013.01)

(58) Field of Classification Search
  CPC ...... F28D 9/0031; F28D 9/0043; F28D 9/005; F28D 9/0056; F28D 1/0341; F28D 1/035; F28D 1/0383; F28D 2215/04
  See application file for complete search history.

(56) References Cited

U.S. PATENT DOCUMENTS

| | | | | |
|---|---|---|---|---|
| 6,360,817 B1* | 3/2002 | Brochin | ............. | B60H 1/00328 165/140 |
| 7,203,064 B2* | 4/2007 | Mongia | ................. | H01L 23/473 165/104.33 |
| 2004/0003916 A1* | 1/2004 | Nash | ..................... | F28D 9/0043 165/153 |
| 2005/0274501 A1* | 12/2005 | Agee | ..................... | F28D 9/0062 165/146 |
| 2007/0175617 A1* | 8/2007 | Brost | .................. | F02B 29/0462 165/149 |
| 2007/0267000 A1* | 11/2007 | Raduenz | ................ | F28D 9/0056 123/568.12 |
| 2009/0285956 A1* | 11/2009 | Landers | ..................... | F25D 3/06 426/477 |
| 2010/0139631 A1* | 6/2010 | Geskes | ..................... | F28F 1/40 123/568.12 |

* cited by examiner

SUPERCHARGE AIR COOLER

CROSS-REFERENCE TO RELATED APPLICATION

This application claims the benefit of PCT Application Serial No. PCT/EP2013/064812 for a SUPERCHARGE AIR COOLER filed on 12 Jul. 2013, which claims priority to French Application Serial No. FR 1256817 filed on 12 Jul. 2012. Both above PCT Application No. PCT/EP2013/064812 and French Application No. FR 1256817 are hereby incorporated by reference in their entirety.

TECHNICAL FIELD

The present invention relates to a charge air cooler of an internal combustion engine.

TECHNOLOGICAL BACKGROUND OF THE INVENTION

In a vehicle equipped with a turbocharged engine, the charge air is compressed before being injected. Compression generates significant heating to more than 200° C. and so, just upstream of the engine, the air flow traverses a charge air cooler so that the air temperature is lowered to less than 80° C.

This temperature proves still too high to attain the performances desired nowadays. Also, charge air coolers must be as small as possible. A new generation of charge air coolers is therefore awaited by the market.

SUMMARY OF THE INVENTION

The present invention is a charge air cooler of which the thermal and dimensional performances greatly exceed those of the prior-art charge air coolers by proposing a simple and economical solution.

With this aim, the invention proposes a heat exchanger with plates assembled in pairs, each pair forming between its plates a first flat flow tube in which a first fluid circulates between a first inlet orifice and a first outlet orifice.

Each pair of plates forms between its plates a second flat flow tube in which a second fluid circulates between a second inlet orifice and a second outlet orifice. The two flat tubes are coplanar and form parallel arms extending in a longitudinal direction of the common plane, which direction is itself perpendicular to a transverse direction of the same common plane in which a transverse air flow traverses the heat exchanger, passing between the pairs of plates. The first tube is upstream in the air flow and the second tube is downstream of the air flow. The air flow is therefore first in thermal exchange with the first tube, then in thermal exchange with the second tube. Thus, the heat exchanger has the advantage of combining two successive heat exchange circuits in one simple structure, which makes it possible to optimise exchange with the traversing air flow.

In one embodiment at least one of the two flow tubes has two parallel longitudinal arms connected by one of their ends in a U. One of the arms of the U is upstream in the air flow, and this is the upstream arm, and the other arm of the U is downstream, and this is the downstream arm.

In another embodiment at least one of the two flow tubes has two parallel longitudinal arms connected at their two ends in a 0, one of the arms of the 0 is upstream in the air flow, and this is the upstream arm, and the other arm of the 0 is downstream, and this is the downstream arm.

The embodiments presented above may be independent, and the two tubes may be realised in a UU, a 00 or may be combined and the tubes may be in a U0.

It is advantageous for the thermal efficiency of the exchanger that the inlet orifice of a flat tube is arranged on the downstream arm and the outlet orifice is arranged on the upstream arm.

Furthermore, the inlet and outlet orifices are arranged in the central zone of the arms and are longitudinally offset from each other so that the stack of plates creates, between the inlet and outlet, a neutral zone not traversed by the transverse air flow and in which the fluid is not cooled.

Whatever the embodiment, in a U, 0 or others, in the case of an exchanger in which the air flow cools down and the first and second fluids heat up, it is advantageous, in order to optimise thermal exchanges, that, measured in the plane common to the two flat tubes and in the transverse direction, the width of the longitudinal arm in which is located the fluid inlet orifice is narrower than the width of the longitudinal arm of the same tube in which is located the fluid outlet orifice.

Conversely, in the case of an exchanger in which the air flow heats up while the first and second fluids cool down, the arm on which the inlet orifice is located may be wider than the arm where the outlet orifice is located.

The longitudinal arms of a U-shaped or 0-shaped circuit are separated by a longitudinal boundary which extends in the longitudinal direction and which is then off-centre, so that one of the longitudinal arms is narrower than the other. The central boundary may also deviate slightly from the strict longitudinal direction. For example, in the case of a U-shaped circuit, this boundary may be inclined, so that at the level of the inlet and outlet orifices one of the arms is narrower than the other, while opposite, at the point where the arms are connected, the two arms are almost the same width. Similarly in the case of a 0-shaped circuit with inlet and outlet orifices at the centre of the longitudinal arms of the 0, the boundary between the longitudinal arms may form a broken line so that at the central level of the orifices one arm is narrower than the other, while at the two ends the two arms have substantially the same width.

Furthermore, the heat exchanger may comprise at least two pairs of plates between which are arranged cooling fins. The latter are oriented in the transverse direction of the air flow and, in the case of an exchanger in which the air flow cools down and the first and second fluids heat up, it is advantageous, in order to optimise thermal exchanges, for the upstream fins situated between the first tubes, upstream in the air flow, to be further away from each other than the downstream fins situated between the second tubes, downstream in the air flow.

Conversely, in an exchanger being provided for heating the transverse air flow while the first fluid and the second fluid cool down, the upstream fins situated between the first tubes upstream in the air flow are closer to each other than the downstream fins situated between the second tubes, downstream in the air flow.

Conversely, in the case of an exchanger in which the air flow heats up while the first and second fluids cool down, it is advantageous, in order to optimise thermal exchanges, for the upstream fins situated between the first tubes, upstream in the air flow at the point where the flow is coldest, to be spaced closer together than the downstream fins situated between the second tubes, downstream in the air flow.

In one specific embodiment of the heat exchanger, the two flat tubes each having two parallel longitudinal arms connected by one of their ends and together forming a UU, the inlet and outlet orifices are arranged at the end of the longitudinal arms.

In another specific embodiment of the heat exchanger, the two flat tubes each having two parallel longitudinal arms connected at their two ends together forming a 00, the inlet and outlet orifices are arranged in the middle of the longitudinal arms. This central arrangement is of interest in two ways. Firstly, the exchanger must be arranged and connected in a structure, and some of them have the fluid inlet-outlet connections placed at the centre of the exchanger. An exchanger of which the inlets-outlets are at the ends of the plates should then be provided with connectors which go from the centre to the end in order thus to connect the structure to the exchanger. These connecting pipes take up significant space, and an exchanger of which the inlets-outlets are at the centre of the plates may be connected directly, and therefore save on the connectors and hence the space necessary for the latter. This space can then be used to increase the number of plates and the heat exchange volume. Secondly, a second advantage of the central connections is that the fluid flow is divided in two, which reduces pressure losses. This improves the flow rate in the cooling system.

According to an alternative to this last embodiment shown, the two flat tubes each have two parallel longitudinal arms connected at their two ends and together form a 00, the four inlet and outlet orifices are then arranged in the central zone of the longitudinal arms, being offset from each other so that the stack of plates creates, between the inlets and outlets, neutral zones not traversed by the transverse air flow and in which the fluid is not cooled.

Moreover, the flat tubes in which the fluids circulate are provided with flow disruptors designed to improve thermal exchanges, which disruptors are further apart from each other in the proximity of the inlet orifice than they are in the proximity of the outlet orifice. More particularly, the density of flow disruptors along the flat tubes increases regularly between the inlet orifice and the outlet orifice.

According to one specific arrangement, the flow disruptors are grouped in sets of several disruptors aligned transversely to the direction of fluid flow so as to form an obstacle which is more difficult for a fluid to cross, and so force the fluid into a zigzag course. In this case, the sets are further apart from each other in the proximity of the inlet orifice than they are in the proximity of the outlet orifice.

More particularly, the heat exchanger may be a charge air cooler that can be used with an internal combustion engine or any other applications requiring the use of two fluids to suitably cool an air flow. The first tubes may be connected to a high-temperature cooling circuit comprising a radiator in which a first engine cooling fluid circulates, and the second tubes may be connected to a low-temperature cooling circuit comprising a condenser and in which a second cooling fluid circulates.

The heat exchanger is moreover fixed to a base, either by brazing, by screwing or by any other means. The base is itself provided with fixing means allowing it to be rigidly connected to an external environment such as the engine compartment, an air duct or the engine.

BRIEF DESCRIPTION OF THE DRAWINGS

Other characteristics, aims and advantages of the invention will be apparent on reading the detailed description below, and on looking at the attached drawings, which are given by way of example without limitation and in which.

DESCRIPTION OF PREFERRED EMBODIMENTS

In the continuation of the description, identical or similar elements will be designated by the same references.

As an illustration but without limitation, the invention is described in relation to a charge air cooler with which an internal combustion engine is fitted. The instructions of the invention may, however, perfectly well be transferred to environments other than the automobile.

Figure 1:
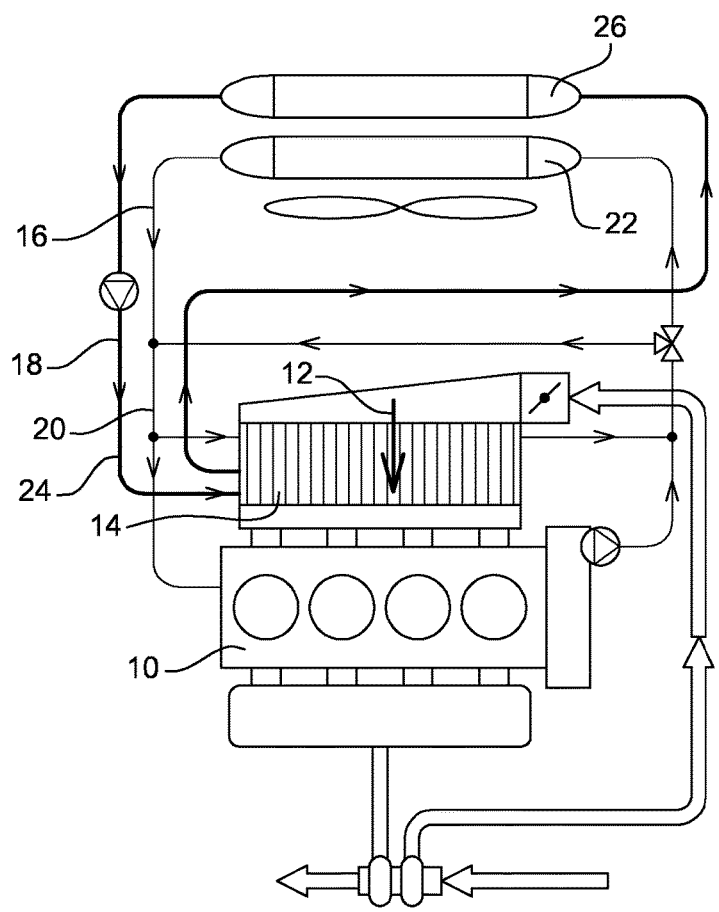
FIG. 1 is a diagram of the charge air cooling circuit of a turbocharged engine, which circuit comprises a charge air cooler according to the invention.

FIG. 1 is a diagram of the cooling circuit of the internal combustion engine 10 of a vehicle. The engine 10 is turbocharged and is supplied with compressed charge air. The air flow 12 heated by compression traverses the charge air cooler 14 where it is cooled before being injected into the engine 10. In the charge air cooler 14 pass a high-temperature (HT) cooling circuit 16 and a low-temperature (LT) cooling circuit 18.

The HT circuit 16, in which a first engine cooling fluid 20 circulates, comprises three parallel-connected sections. The front section comprises a high-temperature radiator 22 arranged at the front of the vehicle, the engine section cools the engine 10, while the charge air cooler section comprises the charge air cooler 14.

The LT circuit 18, in which a second cooling fluid 24 circulates, is a closed-loop circuit which comprises a low-temperature radiator 26 arranged at the front of the vehicle, and the charge air cooler 14.

At the front of the vehicle, the low-temperature radiator 26 and the high-temperature radiator 22 are traversed by an air flow which is a consequence of the vehicle speed or created by a fan. Generally, in relation to the direction of the air flow, the low-temperature radiator 26 is situated upstream of the high-temperature radiator 22. On the other hand, in the charge air cooler 14 and in relation to the charge air flow 12 entering the engine 10, the HT circuit 16 is situated upstream of the LT circuit 18.

Figure 2:
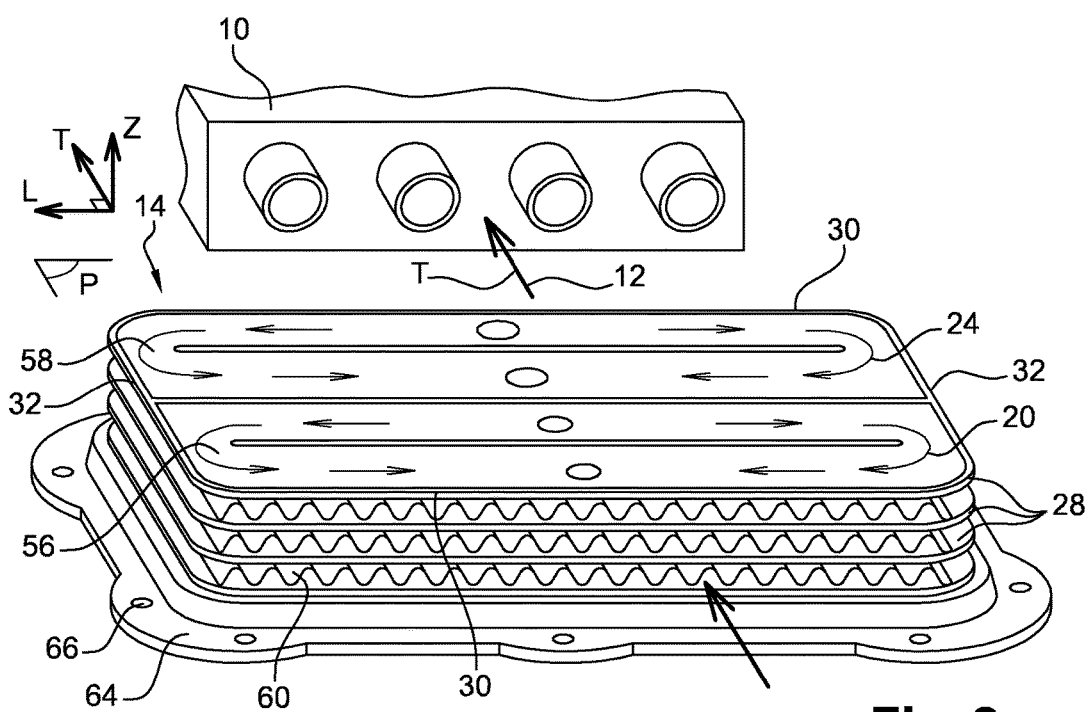
FIG. 2 is a perspective view of the charge air cooler of FIG. 1.

FIG. 2 is a representation of the charge air cooler 14 oriented in an orthogonal triaxial system comprising a longitudinal axis L, a transverse axis T and a vertical axis Z. The charge air cooler 14 is a plate heat exchanger 28. The description below details particular embodiments of the charge air cooler 14.

In a charge air cooler, the charge air flow is cooled while the fluids heat up. Some aspects of the embodiment are connected with this thermal exchange. The instructions of the invention are however easy to transfer to heat exchangers in which the air flow heats up while the fluids cool down. The necessary adaptations are indicated in the body of the description.

The charge air cooler 14 of FIG. 2 comprises rectangular metal plates 28 having two longitudinal edges 30 and two transverse edges 32. The plates 28 are substantially planar and are arranged in pairs. They define two flow circuits independent of each other. The charge air flow 12 traverses the charge air cooler 14 along the transverse axis T and flows in the direction of the axis indicated in FIG. 2.

Prior to assembly, the plates 28 have been shaped, for example by stamping, so that each one has a planar peripheral rim 34 as well as two slightly hollow zones Z1, Z2 fully separated from each other by a longitudinal boundary 36.

The assembly is a vertical stack Z of pairs of plates 28, and between the pairs of plates are interposed cooling fins 60, 62. Assembled against each other, peripheral rim to peripheral rim, the two zones Z1, Z2 delimit two inner spaces forming two planar and coplanar flat tubes P. In each of the two zones is provided an inlet orifice 38, 52 and an outlet orifice 40, 54. Thus two separate fluids, the first cooling fluid 20 and the second cooling fluid 24, can each enter a flat tube and then exit without mixing.

The charge air cooler 14 is fixed to the engine assembly by means of an intermediate base 64 to which it is brazed or screwed or fixed by any other means. The base is itself provided with fixing means 66, and in FIG. 2 are shown for example screw holes which make it possible to fix the charge air cooler 14 and the base 64 to another element of the environment such as the engine or an air duct which serves as a support.

There are numerous possible arrangements for circulation of the fluid in a heat exchanger. Exchangers of which all of the tubes are parallel to each other are known, so that the fluid enters the exchanger and then is distributed in a tube before exiting from the exchanger. There are also exchangers of which the flat tubes are arranged, at least partly, in series one behind the other. In this case, the fluid travels through several tubes before exiting from the exchanger. With the object of improving thermal exchanges between the fluid and the plates, it is also known that flow disruptors can be arranged in the actual interior of the flat tubes. The flow of fluid is then turbulent rather than laminar. These flow disruptors can be mounted as separate elements or they may be bosses formed directly in the plates during the stamping operation, for example. It is also common for final assembly of the charge air cooler to be carried out by brazing.

From a structural point of view, the charge air cooler 14 of FIG. 2, presented in a very general and succinct manner above, integrates in a single structure the two HT 16 and LT 18 circuits.

Figure 3:
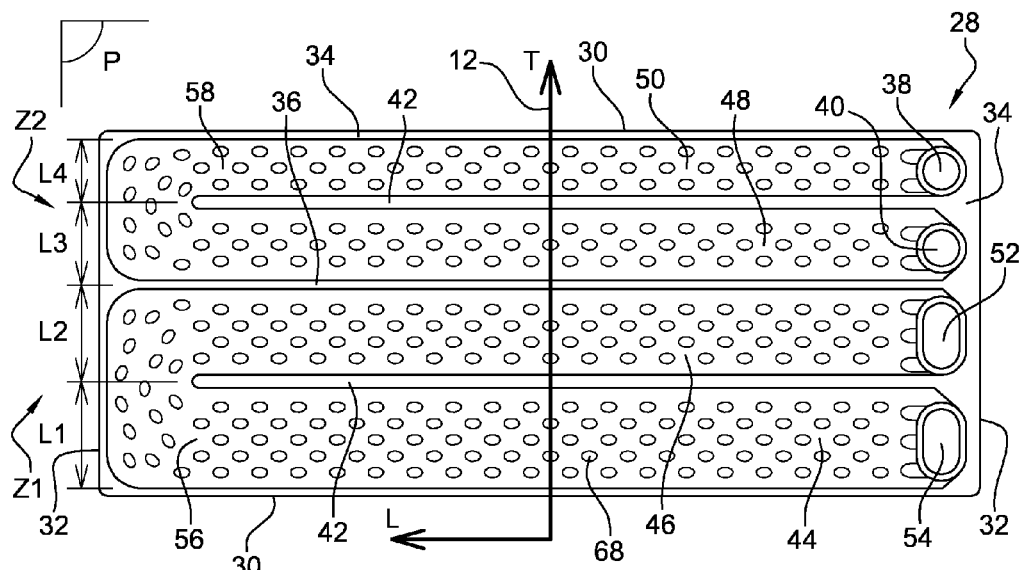
FIG. 3 is a top view of a plate that makes up the charge air cooler of FIGS. 1 and 2.

FIG. 3 shows a first embodiment of the metal plates 28 of the charge air cooler 14. The plate 28, shown in a top view, is divided in two by the longitudinal boundary 36 extending along the longitudinal axis L of a transverse edge 32 to the opposite edge 32. In relation to the charge air flow 12 flowing along the transverse axis T, and in the direction of orientation of the latter, the zones Z1, Z2 are marked as the upstream zone Z1 and the downstream zone Z2.

The upstream zone Z1 is itself provided with a longitudinal barrier 42 partially separating it into two parallel longitudinal arms 44, 46 connected by only one of their ends. The two arms form an upstream arm 44 and a downstream arm 46. The fluid inlet orifice 52 is arranged at the end of the downstream arm 46 while the outlet orifice 54 is arranged at the end of the upstream arm 44. The downstream arm 46, of width L2, by which the fluid 20 enters cold, is less wide than the upstream arm 44, of width L1, by which the same fluid 20 leaves heated.

Like the upstream zone Z1 described above, the downstream zone Z2 is also provided with a longitudinal barrier 42 separating it only partially into two parallel longitudinal arms 48, 50, connected at one of their ends. The two arms form an upstream arm 48 and a downstream arm 50. The fluid inlet orifice 38 is arranged at the end of the downstream arm 50, while the outlet orifice 40 is arranged at the end of the upstream arm 48. The downstream arm 50, of width L4, by which the fluid 24 enters cold, is less wide than the upstream arm 48, of width L3, by which the same fluid 24 leaves heated.

As shown in FIG. 3, the four longitudinal arms 44-50 are parallel, the arm furthest upstream 44 being the widest and the arm furthest downstream 50 being the narrowest.

Figure 4:
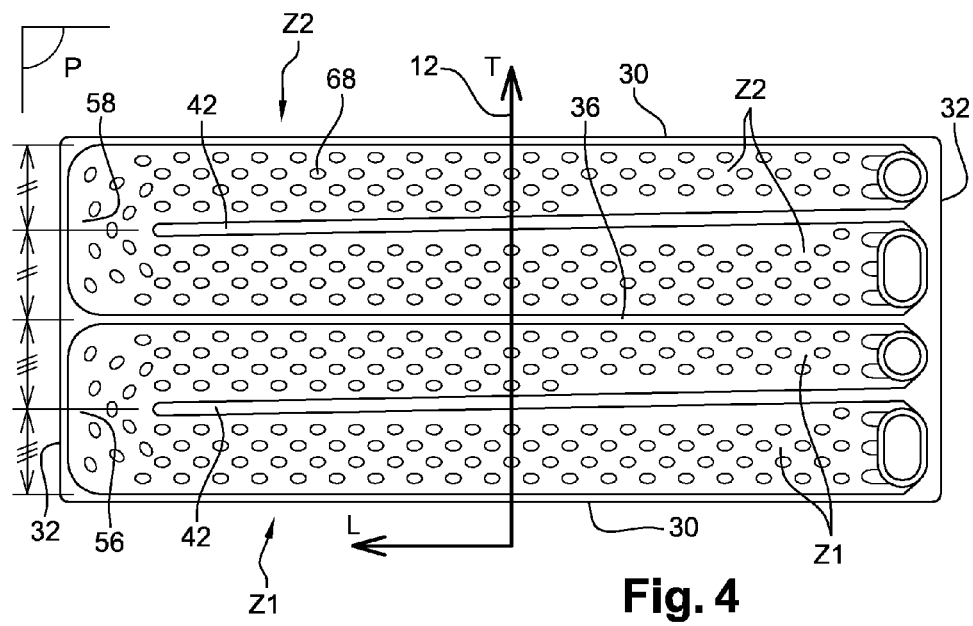
FIG. 4 is an alternative construction of the plate of FIG. 3.

In FIG. 3, the longitudinal barriers 42 extend strictly in the longitudinal direction L, each longitudinal arm therefore having a constant width. FIG. 4 shows an alternative in which the barriers 42 are slightly inclined relative to the longitudinal direction L. Each longitudinal arm then has a width which increases from the inlet to the outlet. At the ends of the arms where the downstream and upstream meet, the arms have substantially the same width.

An alternative in which the inlet port is upstream and the outlet port is downstream is of course possible. In this case it is the upstream arm, the one by which the cold fluid enters, which should be the narrowest. However, the arms may have the same width, particularly in the case of using fluids which expand only very little when their temperature increases.

In the case of plates with arms having different widths or having a progressive width, it is important to note that the plates mounted opposite each other in the same pair are not identical, but symmetrical. During manufacture, a distinction must therefore be made between the bottom plates and the top plates.

Once assembled, the plates 28 of the charge air cooler 14 define the HT upstream tube 56 capable of being connected to the HT circuit 16, and the LT downstream tube 58 capable of being connected to the LT circuit 18. Between the plates 28, the first cooling fluid 20 circulates in the HT upstream tube 56, entering by its downstream arm 46, then joining the outlet orifice 40 at the end of its upstream arm 44. Similarly, the second cooling fluid 24 circulates in the LT downstream tube 58, entering by its downstream arm 58, then joining the outlet orifice 54 at the end of its upstream arm 56.

Figuratively, the HT upstream tube 56 and LT downstream tube 58 of the charge air cooler 14 are arranged to form a "UU", the inlet orifices 38, 52 and outlet orifices 40, 54 being at the free ends of the arms.

Figure 7:
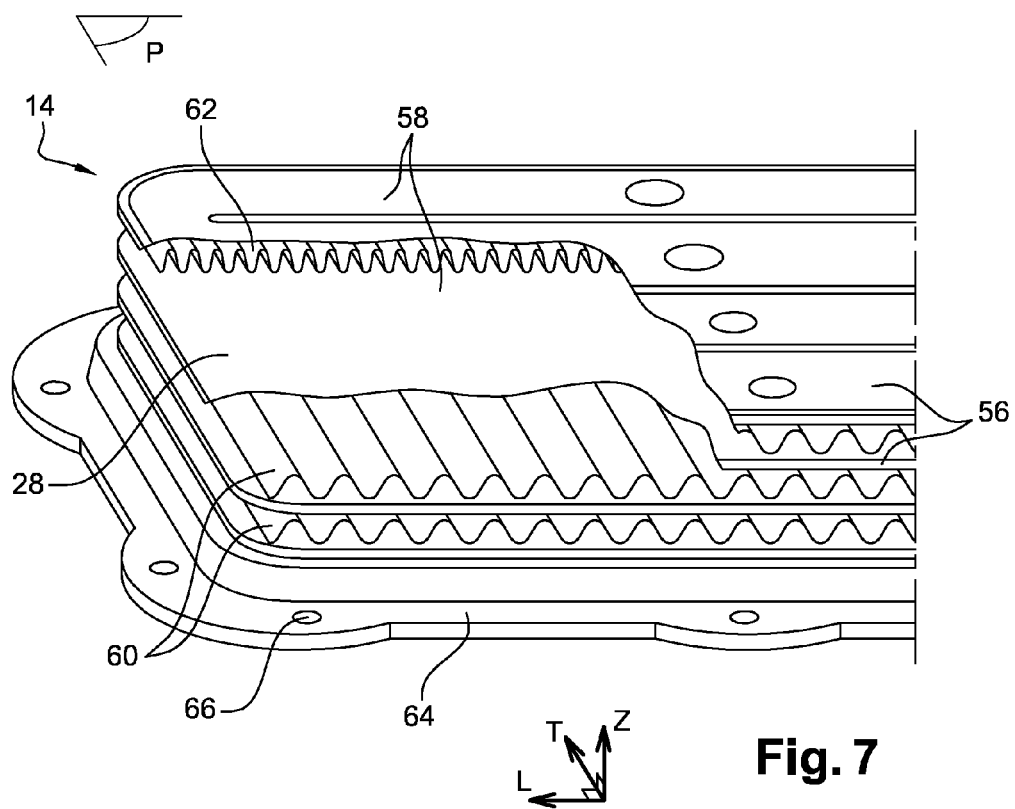
FIG. 7 is a view of the charge air cooler of FIG. 2, sectioned so as to show cooling fins.

FIG. 7 shows that between the flat tubes are placed the cooling fins 60, 62, of which the well-known object is to improve thermal exchange between the plates 28 and the charge air flow 12 traversing the charge air cooler 14. These thin fins 60, 62 extend between the outer faces of adjacent plates 28 and are oriented in the transverse direction T. In relation to the transverse direction T of the charge air flow 12, the fins 60 situated upstream, between two HT upstream tubes 56, at the point where the air flow 12 is hottest, are spaced further apart from each other than the fins 62 situated downstream between two LT downstream tubes 58 at the point where the air flow is coldest.

In the inverse alternative of a heat exchanger in which the fluid heats up while the traversing air flow cools down, the upstream fins are closer together than the downstream fins.

From a functional point of view the charge air 12 enters the charge air cooler 14 at a temperature which may be greater than 200° C. and leaves it at less than 70° C. to be injected into the engine 10. In the charge air cooler 14, the charge air flow 12 is in successive thermal exchange with the HT upstream tube 56, first with its HT upstream arm 44 and then with its HT downstream arm 46, and next with the LT downstream tube 58, first with its LT upstream arm 48 and then with its LT downstream arm 50.

The temperature drop of the charge air 12 is accompanied by heating and expansion of the first cooling fluid 20 in the HT tube 56 and of the second cooling fluid 24 in the LT tube 58. The fluids may for example enter the liquid phase and leave, at least partially, in the gaseous phase. The different widths L1-L4 of the arms of the circuits compensate for this expansion.

Similarly, the charge air flow 12 while cooling undergoes an increase in its density, justifying the fact that the fins 60 situated upstream, between two HT upstream tubes 56, are spaced further apart from each other than the fins 62 situated downstream between two LT downstream tubes 58. The description is limited to two types of fins, those upstream 60 and those downstream 62, each having its own spacing between fins. Embodiments which provide more than two types of fins are of course possible. Thus there could be an arrangement of fins upstream, then fins at the centre and lastly fins downstream, the spacing between fins varying each time.

Other arrangements of lateral arms are possible too. The tubes arranged in a "UU" can be head to tail in a "UU" inverted relative to each other. Similarly, one of the circuits may have only one longitudinal arm, the whole forming a "UI". Lastly, the cooling fins may be constantly spaced from upstream to downstream of the charge air cooler 14.

Figure 5:
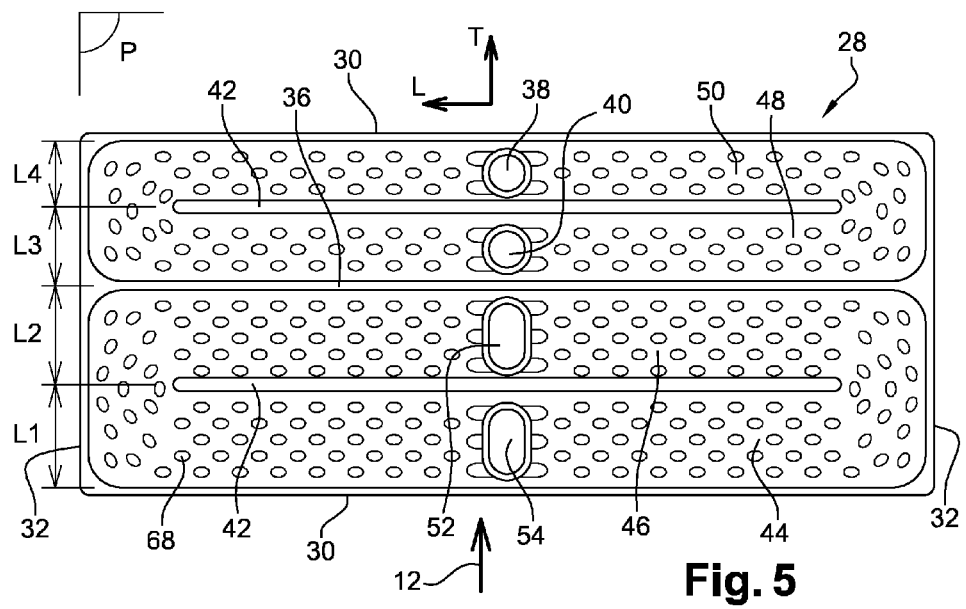
FIG. 5 is a top view of a plate that makes up the charge air cooler of FIG. 1 realised according to another embodiment.

FIG. 5 shows a second embodiment which has particularly been chosen for the charge air cooler 14 of FIG. 2. In this second embodiment, the longitudinal barrier 42 between the longitudinal arms 44, 46 of the HT upstream tube 56 does not reach any of the transverse edges 32 of the plate 28, and therefore the two arms 44, 46 are connected by their two ends forming a closed loop with two longitudinal arms, an upstream arm 44 and a downstream arm 46. The inlet orifice 52 is at the centre of the downstream arm 46, and the outlet orifice 54 at the centre of the upstream arm 44. Thus the first cooling fluid 20 enters the HT upstream tube 56 at the centre of its downstream arm 46, then flows on, separating into two half-flows which meet in the upstream arm 44 where the outlet orifice 40 is arranged.

Similarly to the HT upstream tube 56, the longitudinal barrier 42 of the LT downstream tube 58 between its longitudinal arms 48, 50 does not reach any of the transverse edges 32, and the two arms 48, 50 are also connected at their two ends, also forming a closed loop. The inlet orifice 38 is at the centre of the downstream arm 50, and the outlet orifice 40 at the centre of the upstream arm 48. Thus the second cooling fluid 24 enters the LT downstream tube 58 by its downstream arm 50, then flows on, separating into two half-flows which then meet in the upstream arm 48 where the outlet port 54 is arranged.

Figuratively, the HT upstream tube 56 and the LT downstream tube 58 of the charge air cooler 14 form a "OO", the inlet and outlet orifices being arranged in the middles of the downstream arms 46, 50. Alternatively, the inlet and outlet orifices of a 0-shaped circuit may also be arranged at the top and bottom ends of the 0 and not in the middle of the arms.

As above, in this second embodiment shown by FIG. 5, the downstream arm 46, of width L2, by which the fluid 20 enters cold, is less wide than the upstream arm 44, of width L1, by which the same fluid 20 leaves heated, and the downstream arm 50, of width L4, by which the fluid 24 enters cold, is less wide than the upstream arm 48, of width L3, by which the same fluid 24 leaves heated.

Figure 6:
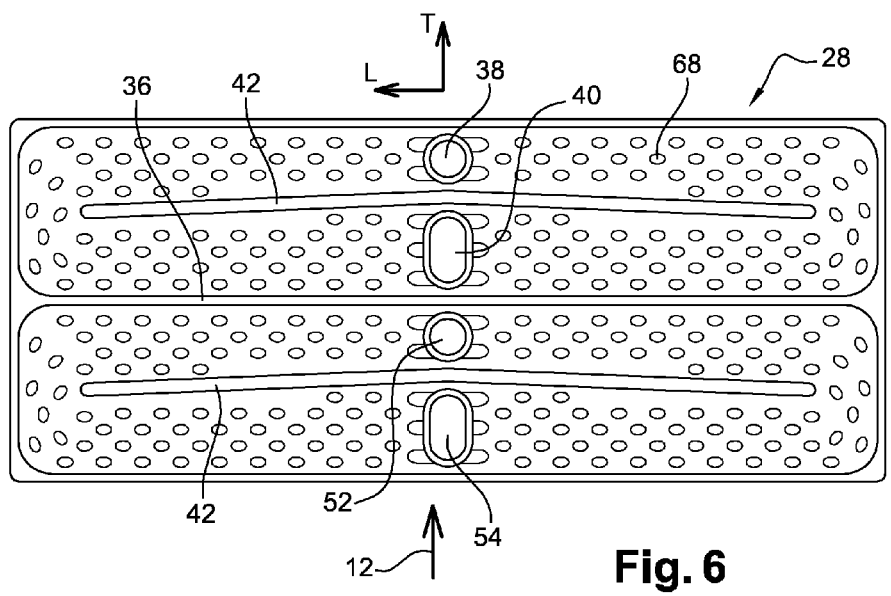
FIG. 6 is an alternative construction of the plate of FIG. 5.

In FIG. 5, the longitudinal barriers 42 extend strictly in the longitudinal direction L, each longitudinal arm therefore having a constant width. FIG. 6 shows an alternative of this second embodiment, in which alternative the barriers 42 form a broken line having two segments which are inclined slightly relative to the strict longitudinal direction L. Each longitudinal arm then has a section which progresses continuously from an inlet orifice to the outlet orifice. At the ends of the arms, where the downstream and upstream meet, the arms have substantially the same width.

According to FIGS. 3-6, the plates 28 are provided with flow disruptors 68 designed to disrupt the boundary layer and to improve mixing of the fluids 20, 24 and so promote thermal exchanges. According to FIG. 8 the disruptors 68 are arranged in sets 70 of several disruptors 68. The sets 70 form alignments transverse to the flow of fluid, creating obstacles and forcing the fluid to follow a zigzag path. Other arrangements of disruptors and sets are of course possible.

Figure 8:
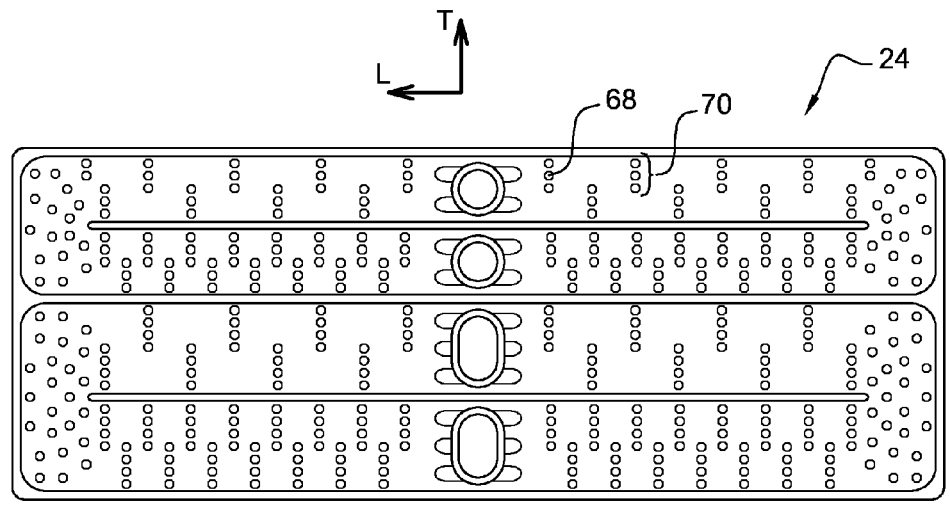
FIG. 8 is similar to FIG. 5, flow disruptors of variable density being provided on the plates.

Furthermore, as can be observed in the drawing, the disruptors 68 are further apart from each other in the proximity of the inlet orifices 38, 52 than in the proximity of the outlets 40, 54. This variation in density of the disruptors is connected with the heat flow which decreases as the fluids flow along the circuits. In FIG. 8 it is the sets 70 of which the density increases in the direction of flow. In FIG. 8, within an arm of a flat tube the density of disruptors is constant. This density varies with the change of arm. In a variant not shown, the density of disruptors may vary continuously between the inlet and outlet openings.

The embodiments shown above may of course be combined, producing HT tubes 56 and LT tubes 58 in any of the combinations of U, 0, I or others. The choice may for example be guided by the properties of the circulating fluids, by the available space, or by the method of connection between the flat tubes.

Similarly, the offset orifices may be combined with the variable density of the disruptors.

The arrangement of FIGS. 5 and 6, in a "00" with inlets and outlets at the centre of the longitudinal arms, has at least two advantages. Firstly, some structures in which the exchanger must be arranged and connected have the fluid inlet-outlet connections centred relative to the location of the exchanger. This is the case with charge air coolers with which certain automobile engines are fitted. An exchanger of which the inlets-outlets are at the ends of the plates should, in order to be capable of being connected, be provided with tubular connectors extending from the centre to the end of the exchanger. These connecting pipes take up significant space, while an exchanger of which the inlets-outlets are at the centre of the plates may be connected directly. The connectors and hence the space necessary for them may therefore be saved, and this space can be used to increase the size of the exchanger, the number of plates and therefore the volume of thermal exchange. Secondly, a second advantage of central connections is that the fluid flow is divided in two, which reduces pressure losses. Since pressure losses are proportional to the square of the flow rate, the overall flow rate of the system may be increased with the same input power of the pump which generates fluid circulation.

Figure 9:
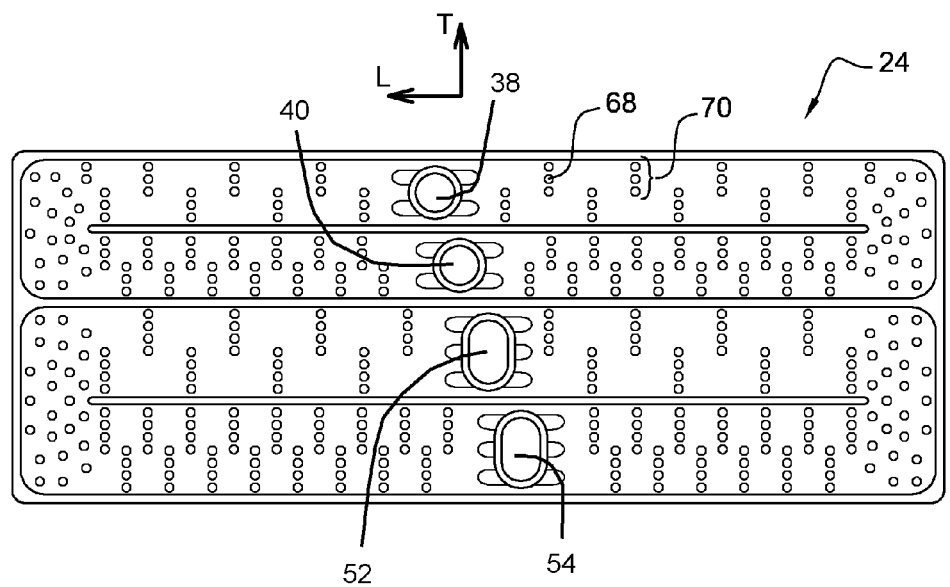
FIG. 9 is similar to FIG. 5, the inlet and outlet orifices being offset.

An optimisation is presented with reference to FIG. 9, forming a longitudinal offset L of the inlet and outlet orifices. This offset makes it possible to optimise thermal exchanges, while ensuring that the whole plate is traversed transversely by the air flow 12, not creating a zone between the orifices, zones which are more difficult for the air flow to access and in which the fluids are less well cooled. As shown in FIG. 9 it is advantageous to keep the orifices in the central zone of the circuits, so that the advantages presented above are preserved.

The invention claimed is:

1. A heat exchanger comprising: plates assembled in pairs including at least a first pair of plates and a second pair of plates, each plate shaped to have a planar peripheral rim, a first hollow zone and a second hollow zone, and a longitudinal boundary fully separating the first hollow zone from the second hollow zone, each pair forming between its plates a first flat flow tube between the first hollow zones, in which a first fluid circulates between a first inlet orifice and a first outlet orifice, and a second flat flow tube between the second hollow zones, in which a second fluid separate from the first fluid circulates between a second inlet orifice and a second outlet orifice, the first and second flat flow tubes being coplanar (P), the first flow tube forming a first pair of parallel arms and the second flow tube forming a second pair of parallel arms, the parallel arms of the first and second pairs extending in a longitudinal direction (L) of the plane (P), which direction is itself perpendicular to a transverse direction (T) of the plane (P) in which a transverse air flow traverses the heat exchanger in the transverse direction, passing between the pairs of plates, the first flat flow tube containing the first fluid being upstream in the air flow and the second flat flow tube containing the second fluid being downstream, the air flow being first in thermal exchange with the first flat flow tube, then in thermal exchange with the second flat flow tube,
wherein the first inlet orifice and the first outlet orifice are located in different arms of the first pair of parallel arms, wherein the second inlet orifice and the second outlet orifice are located in different arms of the second pair of arms, and wherein the parallel arm, in which the second inlet orifice is located, has a smaller width than a width of the parallel arm, in which the first outlet orifice is located,
wherein both the first pair and the second pair of parallel arms include flow disruptors, and wherein the flow disruptors are further apart from each other in the parallel arm containing the second inlet orifice than they are in the parallel arm containing the first outlet orifice,
wherein the parallel longitudinal arms of the first pair are connected to one another at their two ends and together form a flow path with a 00 shape and the parallel longitudinal arms of the second pair are connected to one another at their two ends and together form another flow path with a 00 shape, each of the inlet and outlet orifices being arranged centrally between the two ends of the longitudinal arms and are offset from each other in the transverse direction.

2. The heat exchanger according to claim 1, in which at least one of the two flow tubes has two parallel longitudinal arms, each of the two parallel arms having two ends, the two parallel arms connected at their two ends and forming a flow path in a 0 shape, one of the arms of the 0 shape being an upstream arm upstream in the air flow, and the other arm of the 0 shape being a downstream arm downstream in the air flow.

3. The heat exchanger according to claim 1, in which the inlet and outlet orifices are offset from each other in the longitudinal direction.

4. The heat exchanger according to claim 1, in which the density of flow disruptors along the flat flow tubes increases regularly between the inlet orifice and the outlet orifice.

5. The heat exchanger according to claim 4, in which the flow disruptors are grouped in sets of several disruptors aligned transversely to the direction of flow of at least one of the first fluid and the second fluid.

6. The heat exchanger according to claim 5, in which the sets are further apart from each other in the proximity of the inlet orifice than they are in the proximity of the outlet orifice.

7. The heat exchanger according to claim 6, in which the heat exchanger is a charge air cooler, the first flat flow tube being capable of being connected to a high-temperature cooling circuit comprising a high-temperature radiator in which a first cooling fluid circulates, and the second flat flow tubes being capable of being connected to a low-temperature cooling circuit comprising a low-temperature radiator and in which a second cooling fluid circulates.

8. The heat exchanger according to claim 1, the exchanger being fixed to a base which is itself provided with fixing means allowing the base to be rigidly connected to an external environment.

9. A heat exchanger comprising:
plates assembled in pairs, each pair forming between its plates a first flat flow tube, in which a first fluid circulates between a first inlet orifice and a first outlet orifice, and a second flat flow tube, in which a second fluid separate from the first fluid circulates between a second inlet orifice and a second outlet orifice, the first and second flat flow tubes being coplanar in a plane (P) extending in a longitudinal direction and a transverse direction, the first flat flow tube forming a first pair of parallel arms and the second flat flow tube forming a second pair of parallel arms, both the first and second pairs of parallel arms extending in the longitudinal direction (L) of the plane (P), which direction is itself perpendicular to the transverse direction (T) of the plane (P) in which a transverse air flow traverses the heat exchanger between the pairs of plates, the second flow tube containing the second fluid being downstream of the first flow tube with respect to the air flow, the air flow being first in thermal exchange with the first flow tube, then in thermal exchange with the second flow tube,
each of the parallel longitudinal arms having two ends, wherein the two ends of each of the two parallel arms of the first pair are connected to the two ends of the other one of the two parallel arms to form a flow path in a 0 shape, one of the arms of the 0 shape being an upstream arm upstream in the air flow, and the other arm of the 0 shape being a downstream arm downstream in the air flow, wherein the two ends of each of the parallel arms of the second pair are connected to the two ends of the other one of the two parallel arms to form a flow path in a 0 shape, one of the arms of the 0 shape being an upstream arm upstream in the air flow, and the other arm of the 0 shape being a downstream arm downstream in the air flow,
wherein all of the inlet and outlet orifices are arranged in a central zone of the arms and are offset from each other in the transverse direction and in the longitudinal direction.

10. The heat exchanger according to claim 9, the exchanger being provided for cooling the transverse air flow (T) while the first fluid and the second fluid heat up and in which, wherein in at least one flat flow tube of the first and second flat flow tubes, measured in the common plane (P) and in the transverse direction (T), the width (L1, L3) of the longitudinal arm of the flat flow tube in which is located the outlet orifice for the fluid is wider than the width (L2, L4) of the longitudinal arm of the flat flow tube in which is located the fluid inlet orifice.

11. A heat exchanger comprising: plates assembled in pairs including at least a first pair of plates and a second pair of plates, each plate shaped to have a planar peripheral rim, a first hollow zone and a second hollow zone, and a longitudinal boundary fully separating the first hollow zone from the second hollow zone, each pair forming between its plates a first flat flow tube between the first hollow zones, in which a first fluid circulates between a first inlet orifice and a first outlet orifice, and a second flat flow tube between the second hollow zones, in which a second fluid separate from the first fluid circulates between a second inlet orifice and a second outlet orifice, the two flat flow tubes being coplanar in a plane (P) extending in a longitudinal direction and a transverse direction, the first flat flow tube forming a first pair of parallel arms and the second flat flow tube forming a second pair of parallel arms, both the first and second pairs of parallel arms extending in the longitudinal direction (L) of the plane (P), which direction is itself perpendicular to the transverse direction (T) of the plane (P), in which a transverse air flow traverses the heat exchanger between the pairs of plates, the first flat flow tube containing the first fluid being upstream in the air flow and the second flat flow tube containing the second fluid being downstream, the air flow being first in thermal exchange with the first flat flow tube, then in thermal exchange with the second flat flow tube,
  wherein the first inlet orifice and the first outlet orifice are located in different arms of the first pair of parallel arms, wherein the second inlet orifice and the second outlet orifice are located in different arms of the second pair of arms, and wherein the parallel arm, in which the second inlet orifice is located, has a smaller width than a width of the parallel arm, in which the first outlet orifice is located,
  wherein both the first pair and the second pair of parallel arms include flow disruptors, and wherein the flow disruptors are further apart from each other in the parallel arm containing the second inlet orifice than they are in the parallel arm containing the first outlet orifice,
  further comprising cooling fins arranged and oriented in the transverse direction (T), the cooling fins including upstream fins situated between the first flat flow tube of the first pair and the first flat flow tube of the second pair, and downstream fins situated between the second flat flow tube of the first pair and the second flat flow tube of the second pair, downstream in the air flow from the upstream fins, the upstream fins between the first flat flow tubes of the first and second pairs being spaced apart farther from each other than the downstream fins between the second flat flow tubes of the first and second pairs.

12. The heat exchanger according to claim 11, in which at least one of the two flow tubes has two parallel longitudinal arms, each arm having a first end and a second end, the two arms connected by their first ends and forming a flow path in a U shape, one of the parallel arms of the U shape being an upstream arm upstream in the air flow, and the other parallel arm of the U shape being a downstream arm downstream in the air flow.

13. The heat exchanger according to claim 12, in which the inlet orifice of the at least one of the two flow tubes is arranged on the downstream arm and the outlet orifice is arranged on the upstream arm.

14. The heat exchanger according to claim 11, in which each of the two flat flow tubes has two of the parallel longitudinal arms connected by their first ends and together form a flow path in a UU shape, the inlet and outlet orifices being arranged at the second ends of the longitudinal arms.

15. The heat exchanger according to claim 11, in which the parallel arms of the first pair are connected to one another at their two ends and the parallel arms of the second pair are connected to one another at their two ends, and the first pair and second pair of parallel arms together form a flow path in a 00 shape, each of the inlet and outlet orifices being arranged centrally between the two ends of the longitudinal arms and are offset from each other in the transverse direction.

* * * * *